US012044006B2

(12) United States Patent
Saito

(10) Patent No.: US 12,044,006 B2
(45) Date of Patent: Jul. 23, 2024

(54) OUTDOOR STRUCTURE

(71) Applicant: SEKISUI HOUSE, LTD., Osaka (JP)

(72) Inventor: Kenji Saito, Osaka (JP)

(73) Assignee: SEKISUI HOUSE, LTD., Osaka (JP)

( * ) Notice: Subject to any disclaimer, the term of this patent is extended or adjusted under 35 U.S.C. 154(b) by 0 days.

(21) Appl. No.: 17/769,008

(22) PCT Filed: Jan. 14, 2021

(86) PCT No.: PCT/JP2021/001006
§ 371 (c)(1),
(2) Date: Apr. 14, 2022

(87) PCT Pub. No.: WO2021/153247
PCT Pub. Date: Aug. 5, 2021

(65) Prior Publication Data

US 2024/0102277 A1 Mar. 28, 2024

(30) Foreign Application Priority Data

Jan. 31, 2020 (JP) ................................ 2020-015736

(51) Int. Cl.
*E04B 2/72* (2006.01)
*E04C 2/54* (2006.01)
*E06B 9/52* (2006.01)

(52) U.S. Cl.
CPC .................. *E04B 2/72* (2013.01); *E06B 9/52* (2013.01); *E04C 2/54* (2013.01)

(58) Field of Classification Search
CPC ................. E04B 2/72; E06B 9/52; E04C 2/54
See application file for complete search history.

(56) References Cited

U.S. PATENT DOCUMENTS 1,259,795 A * 3/1918 Smith ....................... E06B 9/52 5/10.1
3,879,017 A * 4/1975 Maxcy .................. E04F 11/181 256/22

(Continued)

FOREIGN PATENT DOCUMENTS

JP 1996-53943 2/1996
JP H0853983 A * 2/1996 ............... E06B 9/01

(Continued)

OTHER PUBLICATIONS

International Search Report issued in application No. PCT/JP2021/001006.

*Primary Examiner* — Brian D Mattei
*Assistant Examiner* — Omar F Hijaz
(74) *Attorney, Agent, or Firm* — McClure, Qualey & Rodack, LLP

(57) ABSTRACT

An example outdoor structure incorporates: an outer wall surface for zoning into indoor space of a building and the outdoors; an outdoor ceiling part projecting outdoors from the outer wall surface; two side walls substantially parallel to each other projecting outdoors from opposite sides of the outer wall surface and each having an upper end connected to the outdoor ceiling part; and a blocking part separated outdoors from the outer wall surface in such a manner as to face the outer wall surface, and used for blocking eyes from outside, wherein the blocking part has a breadth less than a distance between the two side walls and has an upper end connected to the outdoor ceiling part.

3 Claims, 3 Drawing Sheets

(56) References Cited

U.S. PATENT DOCUMENTS

| | | | | | |
|---|---|---|---|---|---|
| 5,575,321 | A * | 11/1996 | Currier | E06B 9/52 49/404 |
| 7,007,735 | B1 * | 3/2006 | Lake | E06B 9/52 160/381 |
| 2005/0098277 | A1 * | 5/2005 | Bredemus | E06B 9/52 160/371 |
| 2005/0235585 | A1 * | 10/2005 | Green | E06B 3/285 52/204.5 |
| 2017/0298615 | A1 * | 10/2017 | Janabi | H02S 20/23 |

FOREIGN PATENT DOCUMENTS

| | | | | |
|---|---|---|---|---|
| JP | 1997-291588 | | 11/1997 | |
| JP | 2002-180677 | A | 6/2002 | |
| JP | 2017-57557 | A | 3/2017 | |
| JP | 2018-150802 | A | 9/2018 | |
| KR | 101529853 | B1 * | 6/2015 | E06B 9/52 |

* cited by examiner

OUTDOOR STRUCTURE

TECHNICAL FIELD

The present invention relates to an outdoor structure of a building such as a house.

BACKGROUND ART

Patent Literature 1 discloses that, in providing a terrace on an outdoor side of a house, forming the terrace under the eaves of a roof achieves advantages such as allowing use of the terrace even in rainy weather and allowing blocking of sunlight, etc.

PRIOR ART LITERATURE

Patent Literature

Patent literature 1: Japanese Patent Application Publication No. 2017-57557

SUMMARY OF INVENTION

Problem to be Solved by Invention

If an outdoor ceiling part is provided that may be eaves of a building such as a house projecting outdoors from an outer wall, space under the outdoor ceiling part can be used effectively by providing a terrace under the outdoor ceiling part, for example, by applying the invention disclosed in Patent literature 1.

However, the invention disclosed in Patent Literature 1 does not give consideration to eyes from outside. Hence, the space under the outdoor ceiling part is exposed to eyes from outside so it may be uncomfortable and difficult-to-use space.

The present invention has been made in view of the above-described circumstances, and is intended to provide an outdoor structure capable of offering a sense of outdoor openness and capable of ensuring privacy by blocking eyes from outside properly.

Solutions to the Problems

To achieve the above-described objects, an outdoor structure according to the present invention comprises: an outer wall surface for zoning into indoor space of a building and the outdoors; an outdoor ceiling part projecting outdoors from the outer wall surface; two side walls substantially parallel to each other projecting outdoors from opposite sides of the outer wall surface and each having an upper end connected to the outdoor ceiling part; and a blocking part separated outdoors from the outer wall surface in such a manner as to face the outer wall surface, and used for blocking eyes from outside, wherein the blocking part has a breadth less than a distance between the two side walls and has an upper end connected to the outdoor ceiling part.

Preferably, the outdoor structure according to the present invention further comprises: an outdoor floor formed on an outdoor side of the outer wall surface; and a first opening part formed at the outer wall surface, wherein the outdoor floor is formed in such a manner that a floor surface of the outdoor floor is at a height substantially flush with a floor surface of the indoor space, and coming and going into and out of the indoor space are allowed through the first opening part.

Preferably, the outdoor structure according to the present invention further comprises: a second outer wall surface for zoning into the indoor space and the outdoors facing the outer wall surface across the indoor space and provided substantially parallel to the outer wall surface; and a second opening part provided at the second outer wall surface.

Preferably, the outdoor structure according to the present invention comprises a mesh screen provided in an openable/closable manner at an outdoor-side opening part of space surrounded by the outer wall surface, the outdoor ceiling part, and the two side walls, the mesh screen being used for preventing entry of insects into the space through the outdoor-side opening part.

Preferably, in the outdoor structure according to the present invention, the outer wall surface faces the north side.

Preferably, in the outdoor structure according to the present invention, at least a part of the blocking part has transmitting properties.

Advantageous Effect of Invention

An outdoor structure according to the present invention comprises: an outer wall surface for zoning into indoor space of a building and the outdoors; an outdoor ceiling part projecting outdoors from the outer wall surface; two side walls substantially parallel to each other projecting outdoors from opposite sides of the outer wall surface and each having an upper end connected to the outdoor ceiling part; and a blocking part separated outdoors from the outer wall surface in such a manner as to face the outer wall surface, and used for blocking eyes from outside, wherein the blocking part has a breadth less than a distance between the two side walls and has an upper end connected to the outdoor ceiling part. Thus, space is formed on an outdoor side of the building that is surrounded on three side surfaces and on the upper surface by the outer wall surface, the two side walls, and the outdoor ceiling part. This space is covered with the outdoor ceiling part from above while being provided outdoors, so that it can be used as space even on rainy days without concerning for rain. Furthermore, this space is surrounded on three side surfaces and recessed from the other side surface opened outdoors. Thus, while being provided outdoors, this space becomes semi-outdoor space that offers a sense of private or a sense of retreat like those obtained indoors. Furthermore, by the provision of the blocking part separated outdoors from the outer wall surface in such a manner as to face the outer wall surface and used for blocking eyes from outside, eyes through the side surface of the semi-outdoor space opened outdoors is blocked by the blocking part to protect privacy in the semi-outdoor space. Furthermore, as the blocking part has the breadth less the distance between the two side walls, a gap is formed between the blocking part and the side wall to prevent the side surface of the semi-outdoor space opened outdoors from being closed completely by the blocking part. Thus, while privacy in the semi-outdoor space is protected by the blocking part, the semi-outdoor space can be space capable of offering a sense of outdoor openness.

Preferably, the outdoor structure according to the present invention further comprises: an outdoor floor formed on an outdoor side of the outer wall surface; and a first opening part formed at the outer wall surface, wherein the outdoor floor is formed in such a manner that a floor surface of the outdoor floor is at a height substantially flush with a floor surface of the indoor space, and coming and going into and out of the indoor space are allowed through the first opening part. Thus, by the presence of the outdoor floor, the floor of the indoor space can be sensed like a floor expanded to the semi-outdoor space formed by the outdoor structure according to the present invention to allow coming and going from the indoor space directly into and out of the semi-outdoor space through the first opening part. As a result, the semi-outdoor space can become more easy-to-use space.

Preferably, the outdoor structure according to the present invention further comprises: a second outer wall surface for zoning into the indoor space and the outdoors facing the outer wall surface across the indoor space and provided substantially parallel to the outer wall surface; and a second opening part provided at the second outer wall surface. This realizes linear arrangement from the second opening part to an outdoor-side opening part of the semi-outdoor space through the indoor space, the first opening part, and the semi-outdoor space formed by the outdoor structure according to the present invention, thereby allowing the semi-outdoor space and the indoor space to become comfortable space letting wind pass through.

Preferably, the outdoor structure according to the present invention comprises a mesh screen provided in an openable/closable manner at an outdoor-side opening part of space surrounded by the outer wall surface, the outdoor ceiling part, and the two side walls, the mesh screen being used for preventing entry of insects into the space through the outdoor-side opening part. As entry of insects into the semi-outdoor space formed by the outdoor structure according to the present invention can be prevented using the mesh screen, even a person afraid of insects can use the semi-outdoor space comfortably.

Preferably, in the outdoor structure according to the present invention, the outer wall surface faces the north side. In this case, the semi-outdoor space formed by the outdoor structure according to the present invention is to be located on the north side of the building. Even in this case, entry of insects is prevented using the mesh screen so that the semi-outdoor space can be space to be used comfortably, thereby allowing effective use of the north side of the building.

Preferably, in the outdoor structure according to the present invention, at least a part of the blocking part has transmitting properties. This allows entry of light or scenery into the semi-outdoor space formed by the outdoor structure according to the present invention through the part of the blocking part having transmitting properties, so that the semi-outdoor space can become more comfortable space.

EMBODIMENTS FOR CARRYING OUT INVENTION

Figure 1:
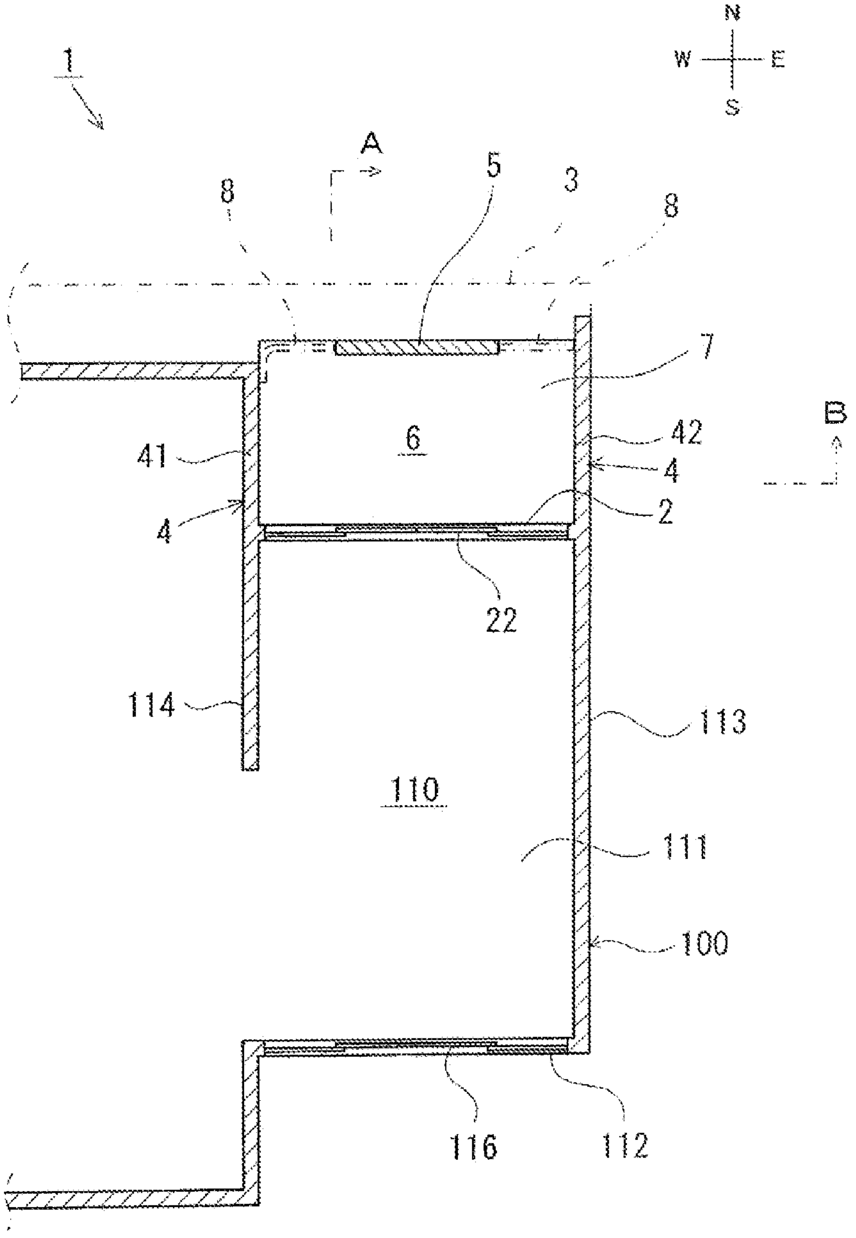
FIG. 1 is an abbreviated cross-sectional plan view showing an outdoor structure according to an embodiment of the present invention.

An embodiment of an outdoor structure according to the present invention will be described below by referring to the drawings. The following merely shows the embodiment of the present invention as an example, and the range of the present invention should not be limited only to the following embodiment but the present invention can be changed appropriately in a range not deviating from the concept of the present invention.

Figure 2:
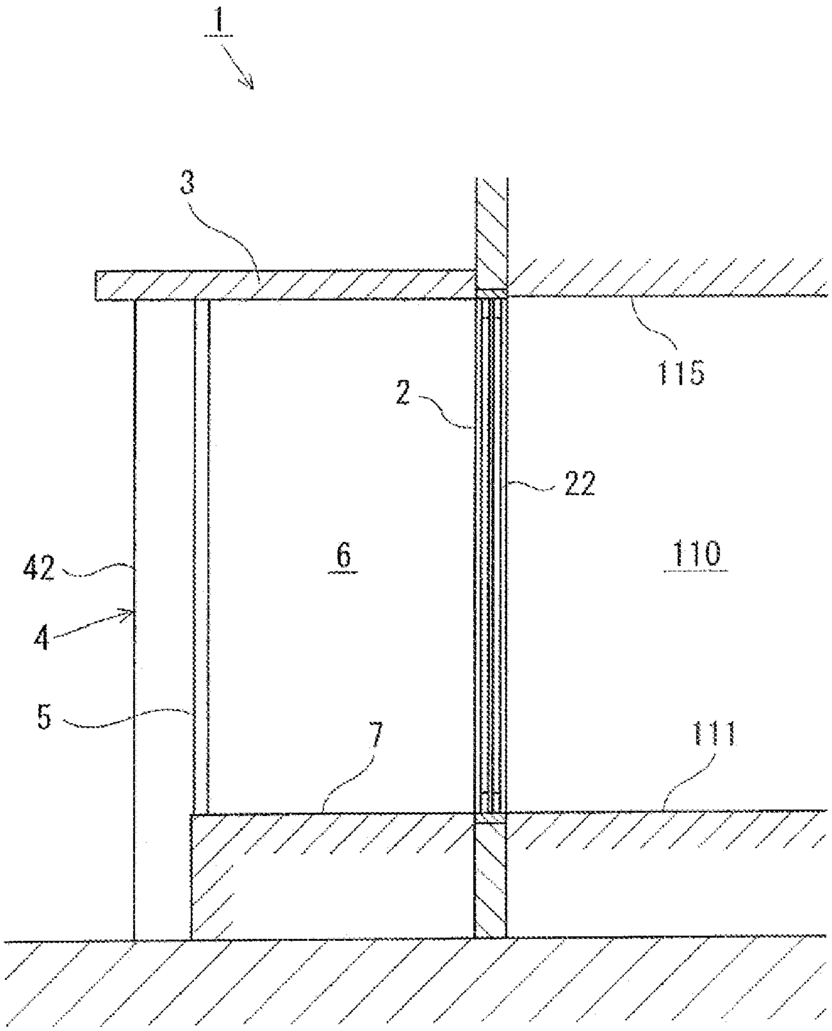
FIG. 2 is an abbreviated cross-sectional side view showing an outdoor structure according to an embodiment of the present invention, and it is an arrow view A shown in FIG. 1.
Figure 3:
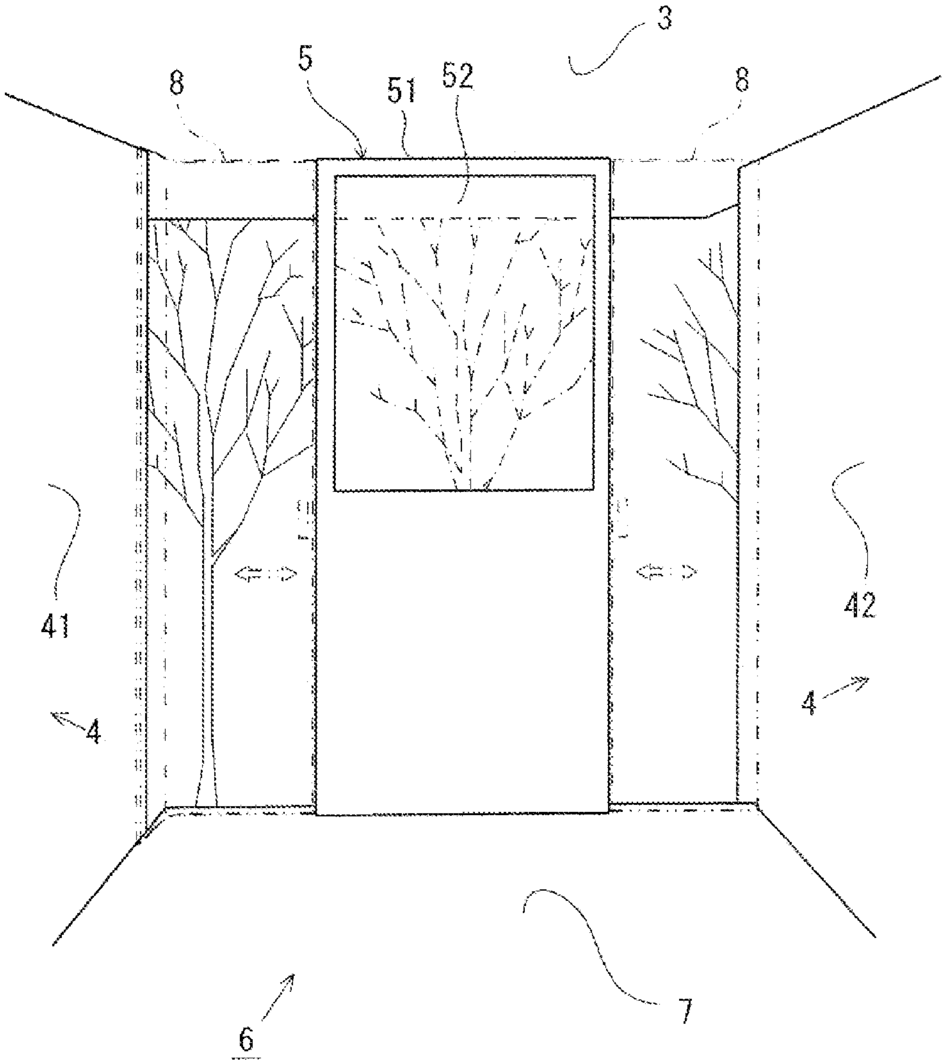
FIG. 3 is a partially cross-sectional front view showing the state of a blocking part of an outdoor structure according to an embodiment of the present invention, and it is an arrow view B shown in FIG. 1.

As shown in FIGS. 1 to 3, an outdoor structure 1 according to the embodiment of the present invention is to be provided on an outdoor side of a building 100 such as a house, and includes: an outer wall surface 2 for zoning into indoor space 110 belonging to the building 100 and the outdoors; an outdoor ceiling part 3 projecting outdoors from the outer wall surface 2; two side walls 4 substantially parallel to each other projecting outdoors from opposite sides of the outer wall surface 2 and each having an upper end connected to the outdoor ceiling part 3; and a blocking part 5 separated outdoors from the outer wall surface 2 in such a manner as to face the outer wall surface 2, and used for blocking eyes from outside. The blocking part 5 has a breadth less than a distance between the two side walls 4 and has an upper end connected to the outdoor ceiling part 3. The outdoor structure 1 according to the present embodiment forms semi-outdoor space 6 on the outdoor side of the building 100 that is surrounded on four side surfaces by the outer wall surface 2, the two side walls 4, and the blocking part 5 and is covered with the outdoor ceiling part 3 from above.

The semi-outdoor space 6 is space covered with the outdoor ceiling part 3 from above while being provided outdoors, so that it can be used as space even on rainy days without concerning for rain.

The semi-outdoor space 6 is space surrounded on three side surfaces by the outer wall surface 2 and the two side walls 4 projecting outdoors from the outer wall surface 2, and recessed in a substantially square-cornered U shape in a plan view from an opened side surface on the other side facing outdoors. Thus, while being provided outdoors, the semi-outdoor space 6 is space that offers a sense of private or a sense of retreat such as those obtained indoors.

Furthermore, the opened side surface facing outdoors of the semi-outdoor space 6 is provided with the blocking part 5 for blocking eyes from outside. The blocking part 5 functions as a blindfold for blocking eyes casted toward the semi-outdoor space 6 from outside, and functions for improving a sense of private or a sense of retreat in the semi-outdoor space 6 by covering the semi-outdoor space 6 partially. As the breadth of the blocking part 5 is less than the distance between the two side walls 4, the blocking part 5 does not cover the opened side surface facing outdoors of the semi-outdoor space 6 entirely but a gap is formed between the blocking part 5 and at least one of the two side walls 4, as shown in FIGS. 1 and 3. This gap is an outdoor-side opening part facing outdoors of the semi-outdoor space 6, so that the semi-outdoor space 6 becomes space opened outdoors through the outdoor-side opening part. Thus, the semi-outdoor space 6 becomes space that offers an atmosphere such as that obtained indoors in which the space is available without concerning for eyes from outside and privacy is ensured while it is opened outdoors, and becomes space offering a sense of outdoor openness or a feel of nature while it is like indoor space.

As described above, the outdoor structure 1 makes the semi-outdoor space 6 available as space provided on the outdoor side of the outer wall surface 2 of the building 100. According to the present embodiment, the outer wall surface 2 is a wall for zoning into indoor space 110 and the outdoors. As shown in FIG. 1, the outer wall surface 2 is arranged in such a manner that the semi-outdoor space 6 and the indoor space 110 are adjacent to each other across the outer wall surface 2.

The indoor space 110 is indoor space available as a room such as a living room with integrated dining room and kitchen provided in the building 100. As shown in FIGS. 1 and 2, in the present embodiment, the indoor space 110 is space surrounded by an indoor floor 111 formed into a substantially rectangular shape, the outer wall surface 2, a second outer wall surface 112, a third outer wall surface 113, and an inner wall 114 provided on each side of the indoor floor 111, and an indoor ceiling surface 115 covering the indoor space 110 from above. The outer wall surface 2, the second outer wall surface 112, and the third outer wall surface 113 are walls forming the outer wall of the building 100. The outer wall surface 2 and the second outer wall surface 112 are provided in such a manner as to face each other. The third outer wall surface 113 is provided in such a manner as to connect the outer wall surface 2 and the second outer wall surface 112 to each other. The inner wall 114 forms the inner wall of the building 100, provided in such a manner as to face the third outer wall surface 113, and is connected to the outer wall surface 2.

The two side walls 4 substantially parallel to each other project outdoors from the opposite sides of the outer wall surface 2. As shown in FIG. 1, in the present embodiment, a first side wall 41 as one of the two side walls 4 is provided in such a manner as to extend the inner wall 114 as far as to the outdoor side of the outer wall surface 2 to become a wall forming the outer wall of the building 100. A second side wall 42 as the other side wall is a wing wall provided in such a manner as to extend the third outer wall surface 113 as far as to the outdoor side of the outer wall surface 2. In this way, the side wall 4 may either be an outer wall or a wing wall.

The outdoor ceiling part 3 projects outdoors from the outer wall surface 2 and covers the semi-outdoor space 6 from above. As shown in FIG. 2, in the present embodiment, the outdoor ceiling part 3 is provided in such a manner as to jut out substantially horizontally from the outer wall surface 2. However, the outdoor ceiling part 3 is not limited to this but may be tilted like the eaves of a roof. The outdoor ceiling part 3 may be formed of the eaves of a root, a canopy, a balcony floor, or the floor of an upper story, for example.

In the present embodiment, the outer wall surface 2 is provided with a first opening part 22 allowing coming and going of a person. The indoor space 110 and the semi-outdoor space 6 communicate with each other in such a manner as to allow coming and going through the first opening part 22. The first opening part 22 is configured by attaching a sash frame to the inner periphery of an opening formed into a substantially rectangular shape at the outer wall surface 2, and fitting a sliding and openable/closable door with wooden latticework inside the sash frame. The first opening part 22 is configured to be opened and closed by opening and closing the door with wooden latticework.

As shown in FIGS. 1 and 2, in the present embodiment, an outdoor floor 7 is provided in the semi-outdoor space 6. The outdoor floor 7 can be configured using a wood deck or a tiled terrace, for example. As shown in FIG. 2, the outdoor floor 7 is provided in such a manner as to jut out outdoors from the outer wall surface 2, and is formed in such a manner that a floor surface of the outdoor floor 7 is substantially flush with a floor surface of the indoor floor 111 provided in the indoor space 110. In this way, the outdoor floor 7 is formed in the semi-outdoor space 6 communicating with the indoor space 110 through the first opening part 22 in such a manner that the floor surface of the outdoor floor 7 is substantially flush with and continuous with the indoor floor 111. By doing so, the indoor floor 111 is expanded to the outdoor side by the outdoor floor 7 to allow the semi-outdoor space 6 to be sensed like space defined by spatially expanding the indoor space 110 outdoors. The indoor floor 111 and the outdoor floor 7 are configured in such a manner as to allow coming and going therebetween through the first opening part 22. In this case, by using a full-flat sash as a sash lower frame provided at the lower side of the first opening part 22 and forming the upper end of this sash to a height that is substantially flush with the heights of the respective floor surfaces of the indoor floor 111 and the outdoor floor 7, substantially flush and continuous extension is provided from the indoor floor 111 to the outdoor floor 7 through the lower side of the first opening part 22, making it possible to improve the continuity further between the semi-outdoor space 6 and the indoor space 110. As the semi-outdoor space 6 where the outdoor floor 7 is provided is covered with the outdoor ceiling part 3 from above, it is possible to go onto the outdoor floor 7 from the indoor floor 111 and use the semi-outdoor space 6 easily without being wet with rain even on rainy days. Additionally, the lower surface of the outdoor ceiling part 3 may be formed in such a manner as to be substantially flush with the indoor ceiling surface 115 in the indoor space 110 to improve the continuity between the indoor space 110 and the semi-outdoor space 6 further.

As shown in FIG. 1, in the present embodiment, the outdoor floor 7 is formed into a substantially rectangular shape in a plan view in which the length of one side and that of the other side of two sides adjacent to each other substantially correspond to a distance between the outer wall surface 2 and the blocking part 5 and correspond to a distance between the two side walls 4 respectively, and is formed through the entire area of the semi-outdoor space 6 surrounded on four sides by the outer wall surface 2, the two side walls 4, and the blocking part 5. As shown in FIG. 2, the blocking part 5 is provided in a standing position at an outdoor edge side of the outdoor floor 7. In this way, if the outdoor floor 7 extends to the position of the outdoor side surface of the semi-outdoor space 6 where the blocking part 5 is installed, the blocking part 5 can be placed on the outdoor floor 7. If the outdoor floor 7 extends only to a position in front of the position of installation of the blocking part 5, the blocking part 5 can be put in a standing position on the ground or foundation, for example.

The blocking part 5 is formed in such a manner that the breadth thereof is less than the distance between the two side walls 4 corresponding to the width of the outdoor side surface of the semi-outdoor space 6. The breadth of the blocking part 5 is preferably a width from one-third to two-thirds of the distance between the two side walls 4, more preferably, about the half of the distance between the two side walls 4. Preferably, the blocking part 5 is provided at a substantially central part of the outdoor side surface of the semi-outdoor space 6 as viewed in the width direction. As shown in FIG. 3, in this configuration, the blocking part 5 is located at the substantially central part of the outdoor side surface of the semi-outdoor space 6 as viewed in the width direction, and gaps of a substantially equal width opened outdoors are provided on the right side and on the left side of the blocking part 5 between the blocking part 5 and the side walls 4 at closer positions. While eyes from outside directed to the interior of the semi-outdoor space 6 are to be passed through the gaps on the right side and on the left side of the semi-outdoor space 6, the semi-outdoor space 6 is surrounded by the side walls 4 on the right side and on the left side and is recessed from the blocking part 5. Thus, eyes from outside toward the semi-outdoor space 6 are to enter from directions substantially vertical to the blocking part 5. As the blocking part 5 has a width that is about the half of the width of the outdoor-side opening part of the semi-outdoor space 6, is located at the substantially central part of the outdoor-side opening part, and space in the semi-outdoor space 6 at the substantially central part of the semi-outdoor space 6 and about the half of the semi-outdoor space 6 is hidden by the blocking part 5. Thus, even if a person is only at one of the right side and the left side in the semi-outdoor space 6, this person is likely to be hidden partially by the blocking part 5 to reduce the risk of being exposed entirely. As a result, while privacy in the semi-outdoor space 6 is protected by the blocking part 5, it is possible to see outdoors through the gaps on the right side and on the left side of the blocking part 5 from the interior of the semi-outdoor space 6 and to feel a sense of outdoor openness. Increasing the breadth of the blocking part 5 reduces the gaps on the right side and on the left side of the blocking part 5 to increase a degree of protection of privacy or a sense of retreat in the semi-outdoor space 6. However, this reduces a sense of outdoor openness. Conversely, reducing the breadth of the blocking part 5 increases the gaps on the right side and on the left side of the blocking part 5 to reduce a degree of protection of privacy or a sense of retreat in the semi-outdoor space 6. However, this increases a sense of outdoor openness. For this reason, in the present embodiment, the breadth of the blocking part 5 is preferably set to about the half of the outdoor-side opening part of the semi-outdoor space 6 in terms of balance. However, this breadth can be designed appropriately according to preference of a resident, etc. Preferably, the gaps formed on the right side and on the left side of the blocking part 5 between the blocking part 5 and the two side walls 4 have such widths as to allow coming and going of a person.

As shown in FIG. 3, in the present embodiment, the blocking part 5 is configured as a partition including a frame 51 as a substantially rectangular flat plate having an opening part at the top, and a transparent panel 52 fitted to the opening part of the frame 51. The frame 51 is made of a material such as iron or wood, for example. The transparent panel 52 is a panel made of a material having transparent properties such as glass or acrylic resin, for example. Using the blocking part 5 including this transparent panel 52 allows entry of light or outdoor scenery into the semi-outdoor space 6 further through the transparent panel 52 of the blocking part 5 installed on the substantially central part of the outdoor-side opening part of the semi-outdoor space 6 as viewed in the width direction. As shown in FIG. 3, by growing plants such as trees on the background of the blocking part 5, it becomes possible to improve a degree of comfortableness in the semi-outdoor space 6. While the transparent panel 52 is provided on an upper part of the blocking part 5 in the present embodiment, it may be provided at a central part or at a lower part. The size or location of the transparent panel 52 can be designed freely. Regarding the transparent properties of the transparent panel 52, the transparent panel 52 may be completely transparent, or may be semi-transparent like frosted glass. In another case, the blocking part 5 may be configured using a louver or a lattice, for example, instead of the transparent panel 52.

The blocking part 5 may be configured as a retro-fittable member such as a partition. In this case, to provide the blocking part 5 in a standing position on the outdoor floor 7, the blocking part 5 is attached by fixing the lower end of the frame 51 of the blocking part 5 to the outdoor floor 7 and fixing the upper end of the frame 51 to the lower surface of the outdoor ceiling part 3 with screws, for example. To provide the blocking part 5 in a standing position on the ground or foundation, for example, the blocking part 5 is installed by fixing the lower end of the blocking part 5 to the ground or foundation with an adhesive anchor, for example. In this way, the blocking part 5 can be installed in a retro-fittable manner. This makes it possible to determine the specifications of the blocking part 5 such as size or color by considering preference of a resident, etc. after the outdoor structure 1 excluding the blocking part 5 is formed.

As shown in FIGS. 1 and 3, a mesh screen 8 for insect repelling may be provided at each of the gaps formed between the blocking part 5 and the two side walls 4. The mesh screen 8 is configured to allow opening and closing of each of the gaps between the blocking part 5 and the two side walls 4. For example, an insect screen may be provided movably along a rail provided at each of the lower surface of the outdoor ceiling part 3 and the floor surface of the outdoor floor 7 and may be opened and closed side to side like a curtain. Alternatively, the insect screen may be opened and closed by being wound and unwound like a roll screen. Providing this mesh screen 8 allows comfortable use of the semi-outdoor space 6 even for a person afraid of insects.

As shown in FIG. 1, the outdoor structure 1 according to the present embodiment is used preferably even if the outer wall surface 2 is provided in such a manner as to face the north side. In many cases, generally, the north side brings the image of being unsunny and damp with many insects, and causing unwillingness to go out even if a garden is provided, for example. Applying the outdoor structure 1 according to the present embodiment to the outer wall surface 2 facing the north side results in provision of the semi-outdoor space 6 on the north side of the building 100. In this regard, a configuration giving consideration to insect repelling is applied to the semi-outdoor space 6 using the mesh screen 8, so that the semi-outdoor space 6 can be used safely without the fear of insects even if it is provided on the north side.

As shown in FIG. 1, in the present embodiment, the second outer wall surface 112 facing the outer wall surface 2 across the indoor space 110 is provided with a second opening part 116. The second opening part 116 is a window openable closable like the first opening part 22. This realizes linear arrangement from the second opening part 116 to the outdoor-side opening part of the semi-outdoor space 6 across the the indoor space 110, the first opening part 22, and the semi-outdoor space 6. Opening the second opening part 116 and the first opening part 22 allows the indoor space 110 and the semi-outdoor space 6 to become comfortable space letting wind pass through. In this case, even if the outer wall surface 2 faces the north side and the semi-outdoor space 6 is arranged on the north side, wind coming through the second opening part 116 on the south side is still allowed to enter the semi-outdoor space 6, thereby allowing the semi-outdoor space 6 on the north side to become more comfortable space.

INDUSTRIAL APPLICABILITY

An outdoor structure according to the present invention is particularly suitable for use in the housing industry.

DESCRIPTION OF REFERENCE SIGNS

1 outdoor structure
2 outer wall surface
22 first opening part

3 outdoor ceiling part
4 side wall
41 first side wall
42 second side wall
5 blocking part
51 frame
52 transmitting panel
6 semi-outdoor space
7 outdoor floor
8 mesh screen
100 building
110 indoor space
111 indoor floor
112 second outer wall surface
113 third outer wall surface
114 inner wall
115 indoor ceiling surface
116 second opening part

The invention claimed is:

1. An outdoor structure comprising:

an outer wall surface for zoning into indoor space and outdoors on a first floor of a building;

semi-outdoor space formed on an outdoor side from the outer wall surface;

a first opening part formed at the outer wall surface, and allowing to entry into and out of the indoor space and the semi-outdoor space;

an outdoor ceiling part projecting to the outdoors from above the outer wall surface;

two side walls substantially parallel to each other projecting to the outdoors from opposite sides of the outer wall surface and each having an upper end connected to the outdoor ceiling part;

a blocking part separating the outdoors from the outer wall surface in such a manner as to face the outer wall surface, and used for blocking a view from the outdoors, wherein the blocking part has a transparent panel, whose breadth being about half of the width of the distance between the two side walls, whose lower end being fixed to an outdoor floor of the semi-outdoor space formed in such a manner that a floor surface of the outdoor floor is at a height substantially flush with a floor surface of the indoor space and whose upper end being fixed to the outdoor ceiling part, such that the transparent panel is located at a substantially central part between the two side walls;

gaps of substantially equal width open to the outdoors are provided on the right side and on the left side of the blocking part, between the blocking part and the two side walls, respectively; and a mesh screen provided in an openable/closable manner at an outdoor-side opening part of space, within the gaps, surrounded by the outer wall surface, the outdoor ceiling part, and the two side walls.

2. The outdoor structure according to claim 1, further comprising:

a second outer wall surface for zoning into the indoor space and the outdoors facing the outer wall surface across the indoor space and provided substantially parallel to the outer wall surface; and a second opening part provided at the second outer wall surface.

3. The outdoor structure according to claim 1, wherein the outer wall surface faces a north side.

* * * * *